United States Patent
Maleport et al.

(10) Patent No.: US 8,144,730 B2
(45) Date of Patent: Mar. 27, 2012

(54) AUTOMATED TACTICAL DATALINK TRANSLATOR

(75) Inventors: Joel J. Maleport, O'Fallon, MO (US); Bryan P. Resnik, Foristell, MO (US)

(73) Assignee: The Boeing Company, Chicago, IL (US)

( * ) Notice: Subject to any disclaimer, the term of this patent is extended or adjusted under 35 U.S.C. 154(b) by 929 days.

(21) Appl. No.: 11/301,453

(22) Filed: Dec. 13, 2005

(65) Prior Publication Data

US 2007/0133601 A1 Jun. 14, 2007

(51) Int. Cl.
*H04J 3/16* (2006.01)

(52) U.S. Cl. .................................................. 370/467

(58) Field of Classification Search .............. 370/466, 370/467; 717/108–113
See application file for complete search history.

(56) References Cited

U.S. PATENT DOCUMENTS

| | | | |
|---|---|---|---|
| 6,125,363 A | 9/2000 | Buzzeo et al. | |
| 6,374,401 B1 | 4/2002 | Curtis | |
| 6,427,230 B1 * | 7/2002 | Goiffon et al. | 717/108 |
| 6,643,652 B2 | 11/2003 | Helgeson et al. | |
| 6,742,175 B1 | 5/2004 | Brassard | |
| 6,889,260 B1 * | 5/2005 | Hughes | 709/246 |
| 6,912,522 B2 | 6/2005 | Edgar | |
| 7,072,934 B2 | 7/2006 | Helgeson et al. | |
| 7,171,646 B2 * | 1/2007 | Charisius et al. | 717/100 |
| 7,389,492 B2 * | 6/2008 | Chupa et al. | 717/106 |
| 2003/0221165 A1 | 11/2003 | Young et al. | |
| 2004/0059705 A1 | 3/2004 | Wittke et al. | |
| 2004/0216085 A1 * | 10/2004 | Wilson et al. | 717/108 |
| 2005/0022115 A1 | 1/2005 | Baumgartner et al. | |
| 2006/0020586 A1 | 1/2006 | Prompt et al. | |
| 2006/0070051 A1 * | 3/2006 | Kuck et al. | 717/162 |
| 2006/0143223 A1 * | 6/2006 | Ivanova | 707/103 R |
| 2007/0047279 A1 * | 3/2007 | Evans et al. | 365/1 |

* cited by examiner

*Primary Examiner* — Ayaz Sheikh
*Assistant Examiner* — Hai-Chang Hsiung
(74) *Attorney, Agent, or Firm* — Armstrong Teasdale LLP

(57) ABSTRACT

An automated system for translating datalink information and producing a computer code based on the translated datalink information. The computer code may subsequently be used to establish datalink communications between pieces of equipment having different communication protocols. The automated production of computer code reduces time and errors during software development for applications used in communicating between different datalinks.

14 Claims, 7 Drawing Sheets

AUTOMATED TACTICAL DATALINK TRANSLATOR

FIELD OF THE INVENTION

Embodiments of the present invention relate generally to computer systems and, more particularly, to computer systems for translating data received from a datalink and generating a computer source file for use in datalink communications.

BACKGROUND

When computers and applications communicate between each other, they must use an agreed upon protocol. Unlike humans however, computers cannot tolerate even the most subtle of differences in the implementation of protocols. Every bit, byte, and combination thereof used by the two systems must be interpreted by both sides to mean exactly the same thing. Further complicating this matter is that there is a large variety of protocols in use today. Their purposes and complexities vary widely. Traditionally, the translation from one protocol to another has entailed the process of hand coding the translation process.

In many areas of communications, especially in military applications, data is transferred between various pieces of equipment. In the military, such data is transmitted using a datalink, for example, a link 16 datalink. Data transmission over these datalinks are becoming increasing complex since some datalinks do not use the same data or may not interpret data in the same manner as other datalinks. In addition, the complexity is increased due to additional datalinks being created for new or improved pieces of equipment.

Currently, the transmission of data between different datalinks involves coding specialized programs to interpret information from one datalink and converting the information into a format that can be used by another datalink. In order to provide this specialized software, software engineers must familiarize themselves with protocols from each datalink to know what information is required for each datalink to function correctly. Hand coding protocol translations has been done for years and has been shown to be very tedious, costly, and error prone due to the largely human aspect of this process, requiring each software engineer assigned to creating a link interface to know what information is required for a given datalink.

Once a software engineer is familiar with all the requirements for each datalink included in a link interface, the software engineer must provide a program for interpreting datalink information and converting the information into a format for use with other datalinks connected to the link interface. Such a program involves manual entry of information required by each datalink as well as interpreting how information should be transmitted to another datalink although there may not be a direct correlation with another datalink. Creating a program each and every time different datalinks interface interact involves substantial manpower and time. In addition, due to the monotony of such a task for a software engineer, programming errors abound which increase the time frame for developing each program as well as the cost for the production of each program.

In an attempt to address some of these issues, the development community has embraced the extensible Markup Language (XML) as the defacto standard for exchanging information between computers. Unfortunately, there are several drawbacks to XML which make this process less than optimal. First, XML tends to be very bandwidth hungry. This can be a crippling problem for systems having bandwidth constraints. Further, XML is a set of guidelines for building a protocol, in and of itself is not a protocol. Thus, each developer still has to do the work necessary to define what the protocol is comprised of. This means that again, the two machines must agree on how to interpret the XML just as if the protocol was written in a binary form. So XML by itself does not solve this problem. Extensible Stylesheet Language Transformation (XSLT) was developed to translate XML to/from other formats, but it does not handle the translation of binary message formats, and is also constraining in the fact that it is a black box process which means that it can be difficult to inject custom translations which cannot be defined by XSLT alone. XSLT also tends to be a very process intensive process thereby consuming memory and processing resources that are otherwise needed by the application that an operator may be trying to run. Finally, there are many protocols in use today that require translation from one format to the next. Many of these protocols are binary.

There is a need for a tool that can assist in the interface of systems using different communications protocols. In addition, there is a need and desire to provide software that reduces the need for specialized programs for use as an interface between different datalinks. Accordingly, there is a need and desire for a method and software tool to that will facilitate the development of translation software for the exchange of information over opposing protocols without the need to hand code each translation.

SUMMARY

According to aspects of various described embodiments, an automated tactical datalink translator (ATDT) translates information to be transmitted between differing datalinks. The ATDT allows for communications between the datalinks using different communication protocols without requiring an in depth knowledge of datalink requirements for a given datalink by a software engineer. The ATDT provides a common language interface that can be associated with a variety of datalink formats. By providing a common language interface that includes the requirements of multiple datalinks, the ATDT reduces time, cost and errors since programming complexity and monotony are eliminated.

The ATDT receives information from a datalink and converts the information received into a common language. Once the information is converted into a common language, the data is matched and translated into a format that is used by another datalink that is designated by the software engineer. Subsequently, the ATDT outputs the received information as a file, which is in a format useful to the receiving datalink. Accordingly, software production for datalink interfaces is automated reducing time and cost during software development. In addition, the information output by the ATDT can be combined with other programs or application code to produce an executable application which provides communications between various pieces of equipment that have different communications protocols.

Embodiments may be implemented as a computer process, a computer system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

GENERAL DESCRIPTION

Figure 1:
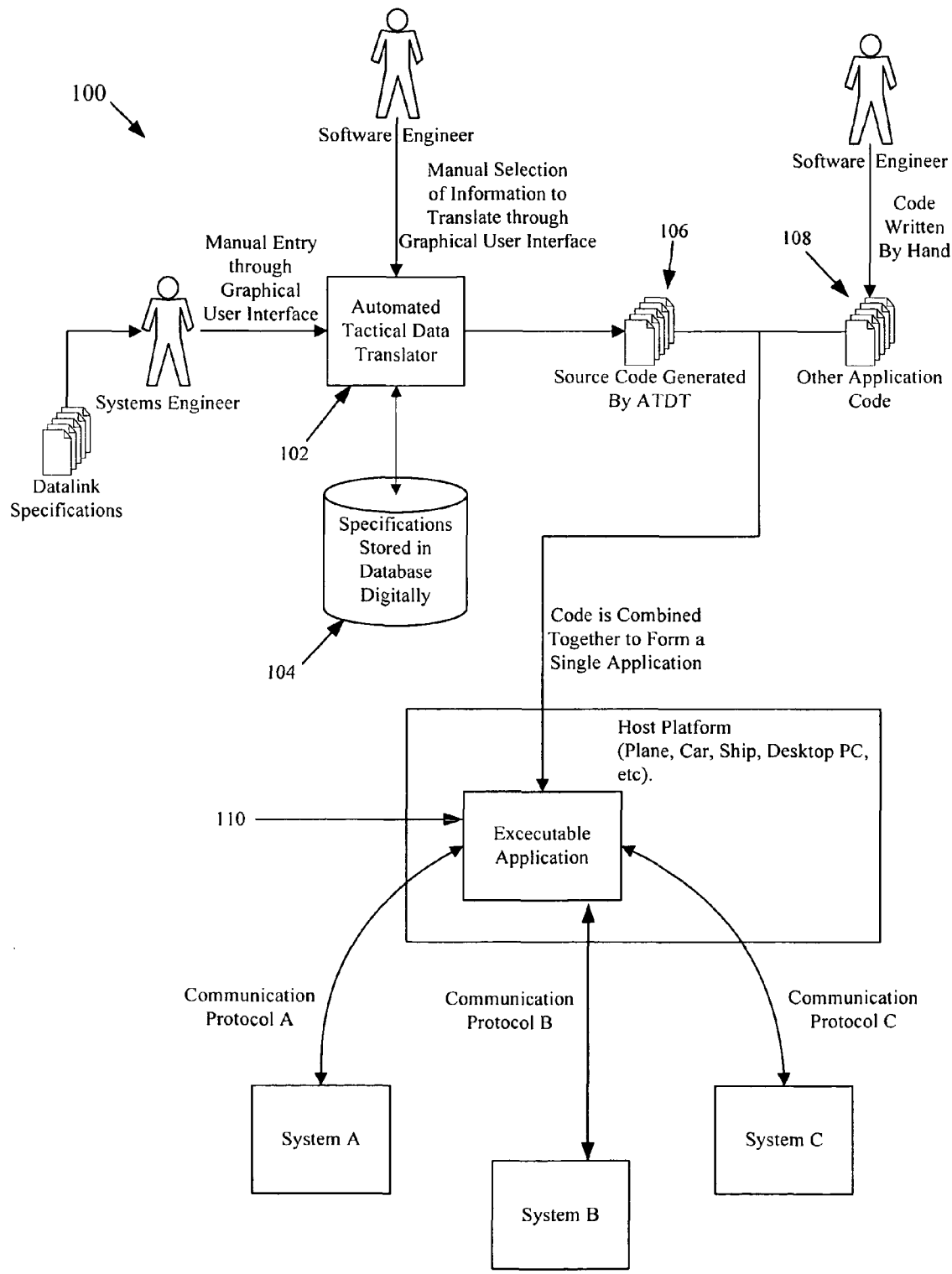
FIG. 1 is a diagram illustrating an exemplary system for creating an executable application for use with a variety of systems having different communication protocols, according to one embodiment.

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (a) as a sequence of computer implemented steps running on a computing system and/or (b) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

The Automated Tactical Datalink Translator (ATDT) proposes a process that would provide an automated method of generating code for the purpose of translating between any two computer protocols regardless of their underlying representation (be it binary or text). It is important to distinguish the ATDT process as one that generates the translation code but does not perform the actual translation itself. Accordingly, ATDT is configured such that the code it generates may be integrated into a larger system.

The basic approach is to load the definition of the protocol into a database and tag each of the elements that make up the protocol. Thus there would be tags for each individual message, each field in a message (or groupings there of), each bit in each field (where appropriate), and the meaning of each value in each field. These tags represent metadata (data about data). The metadata would be standardized in the process so as to identify mutual fields and messages in a universal format that could then be used to identify common structures within the protocols. These common structures would then be used as the foundation for the next step in the process.

This next step would entail the mapping of common constructs in one protocol to constructs in another protocol. This is an automated process, which could be repeated as many times as necessary against as many protocols as desired. The advantage of this process is that the operator/developer is freed from the need to learn the finer details of a new protocol. The use of metadata would allow mapping to be automated thereby saving the considerable amount of time that is typically expended learning a new protocol. Further, the operator/developer could work in the terms of the protocol for which they are most familiar.

Upon the completion of the mapping common constructs, the automated process could be carried out further to generate the software that performs the translation of one protocol to the next. The ATDT proposes a method that would allow the code to be written to one of several dominant programming languages currently available for use, including but not limited to C/C++, Visual Basic, Visual Basic.NET, C#, Java, Ada.

FIG. 1 illustrates an exemplary system 100 for creating an executable application for use with a variety of systems having different communication protocols. In this embodiment, system 100 includes an automated tactical data translator (ATDT) 102, a specifications database 104, source code 106, application code 108 and an executable application 110.

Figure 3:
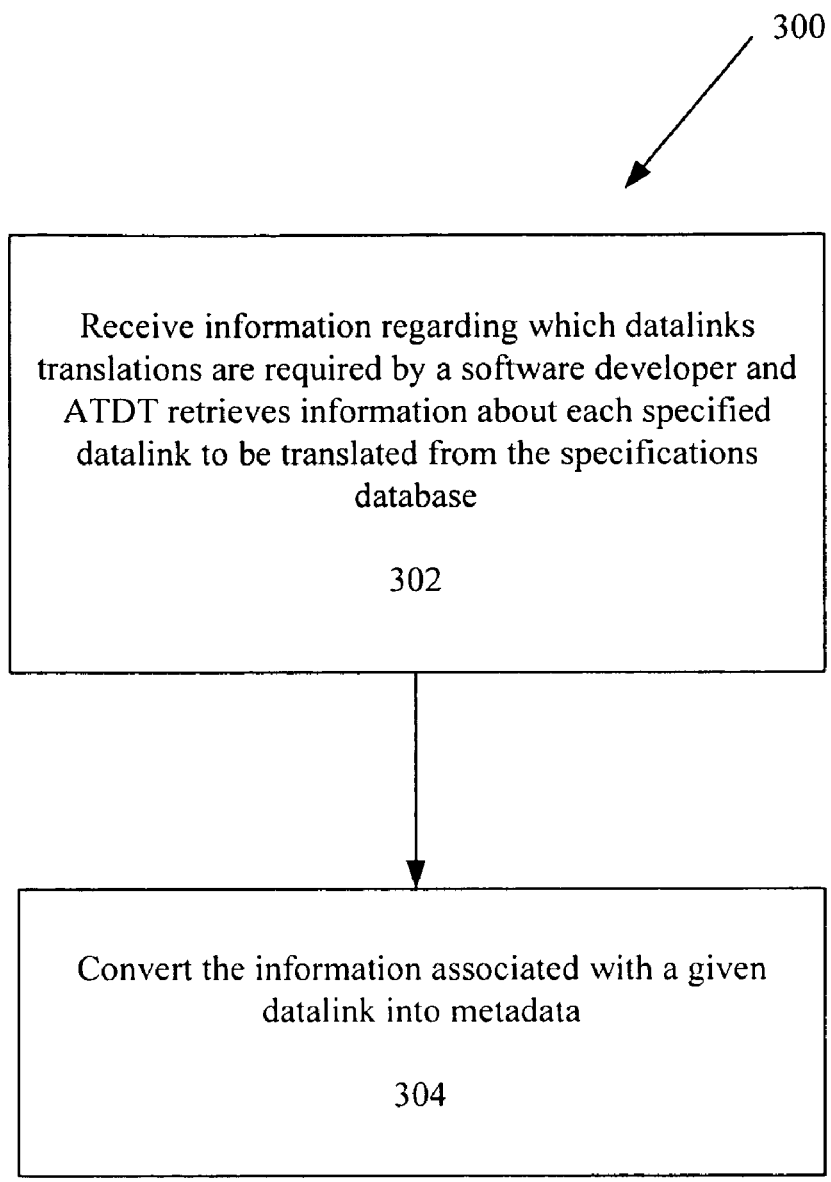
FIG. 3 is a diagram illustrating an exemplary operational flow for converting received datalink information into metadata by an automated tactical datalink translator, according to one embodiment.
Figure 4:
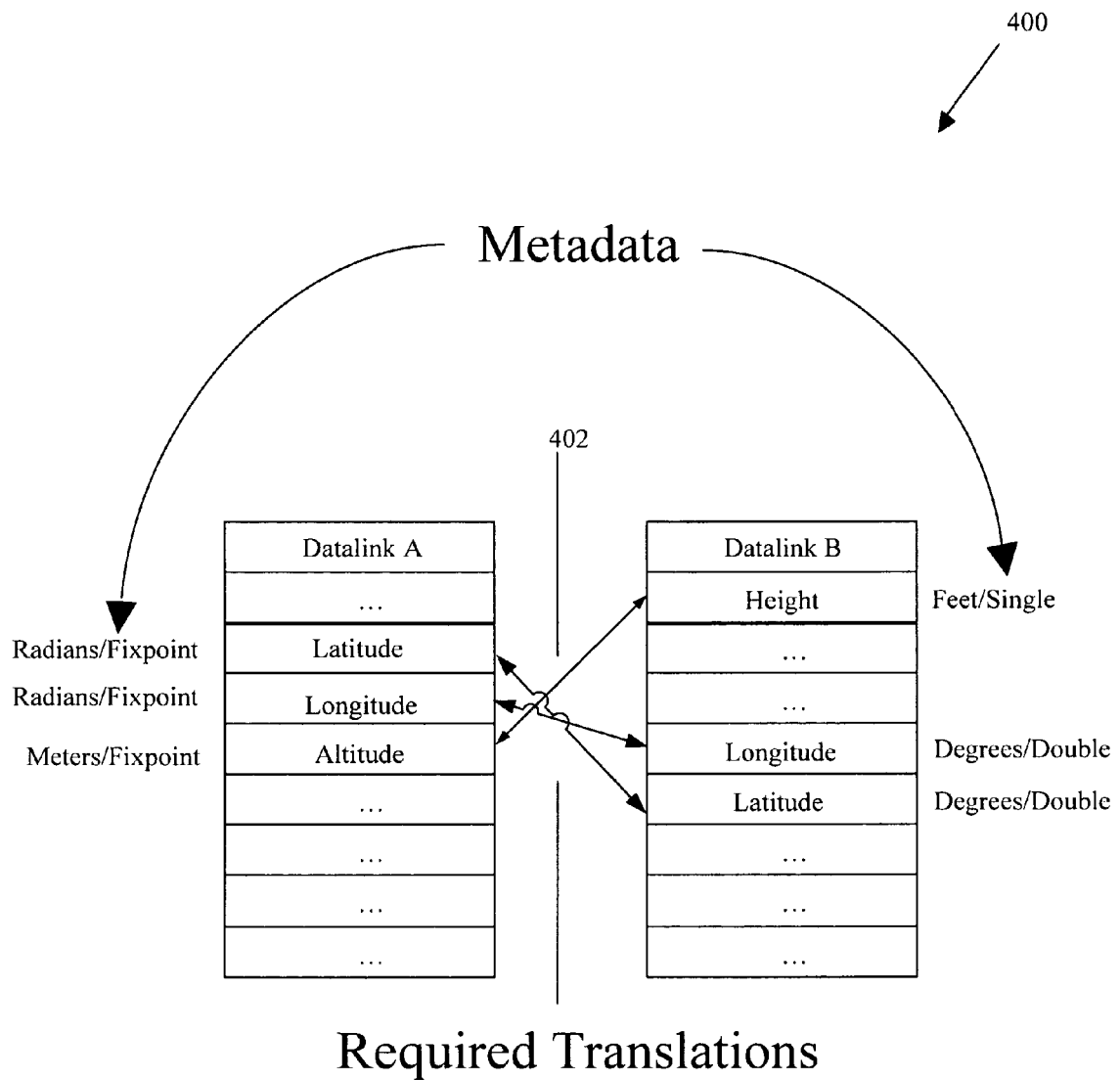
FIG. 4 is a diagram illustrating an exemplary operational flow for matching metadata and translating fields of information between datalinks by an automated tactical datalink translator, according to one embodiment.
Figure 5:
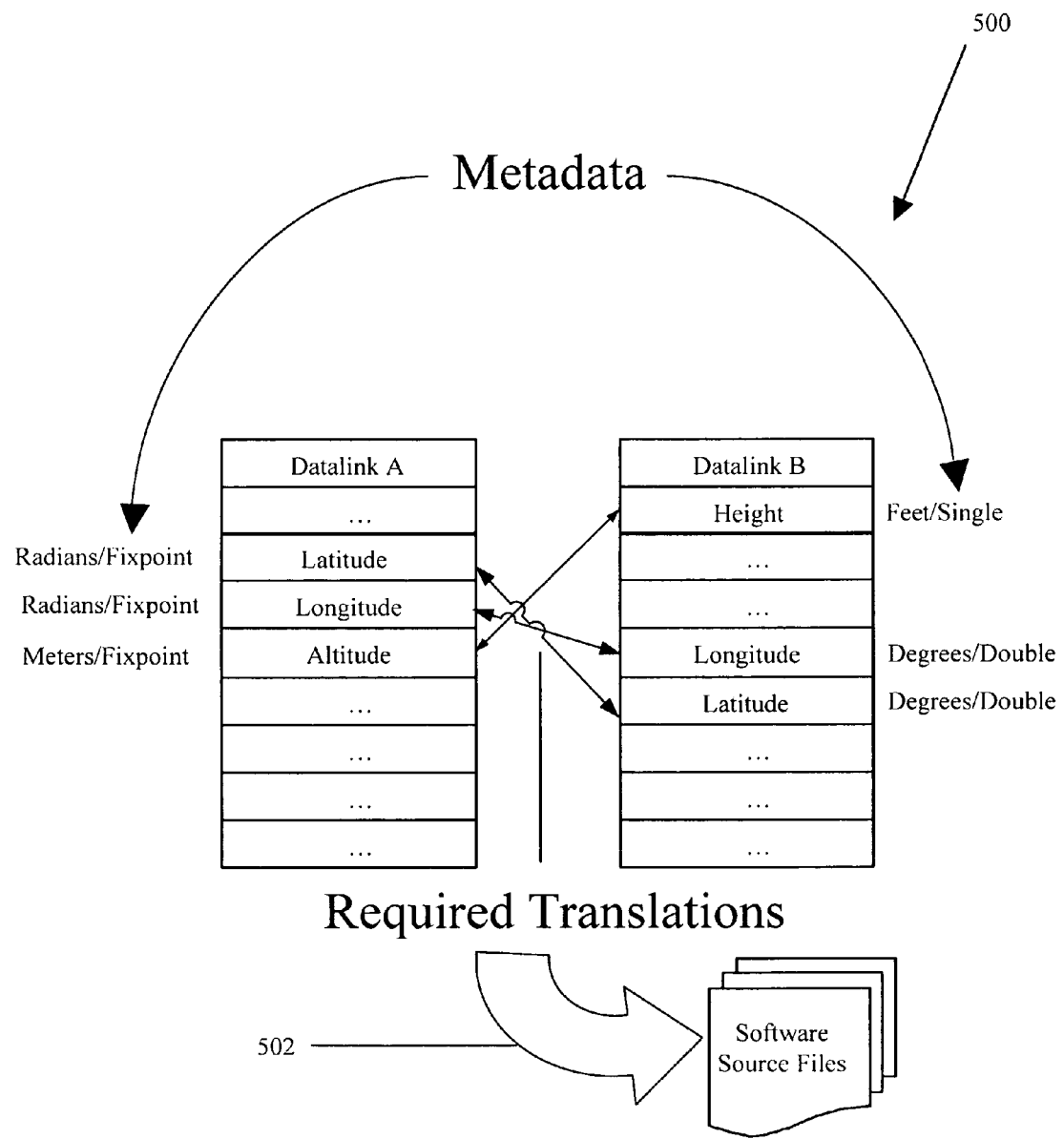
FIG. 5 is a diagram illustrating an exemplary operational flow for generating a computer source file having datalink translations created by an automated tactical datalink translator, according to one embodiment.

The ATDT 102 is accessible by software developers through one or more graphical user interfaces (GUI) associated with the ATDT 102 (operations of the ATDT 102 are provided in the discussion of FIGS. 3-5). The GUI can be used to input information regarding datalink specifications into the ATDT 102. The GUI can also be used for inputting information required to match and convert information received by the ATDT 102 from various datalinks into a format useful to other datalinks. The information received by the ATDT 102 for use matching and converting information from the various datalinks is subsequently stored in the specifications database 104.

The source code 106 can be created by the ATDT 102. The source code 106 can be, for example, a set of libraries for use by a software developer in other areas of software development. The source code 106 may be used in translating information received from one datalink into a format that can be utilized by other datalinks. The source code 106 may be created in a variety of software formats.

The application code 108 can be created by a software developer, and may include code that is specific to a particular system or datalink. The application code 108 is software that typically involves a fair of amount of testing and individual attention that is not suitable for automation. Since the source code 106 may not include all of the components necessary for a completely executable application 110, the application code 108 is utilized to addresses a variety of these components, for example, an operating system interface, user interfaces, radio control, initialization, self test and data recording among other things.

Figure 2:
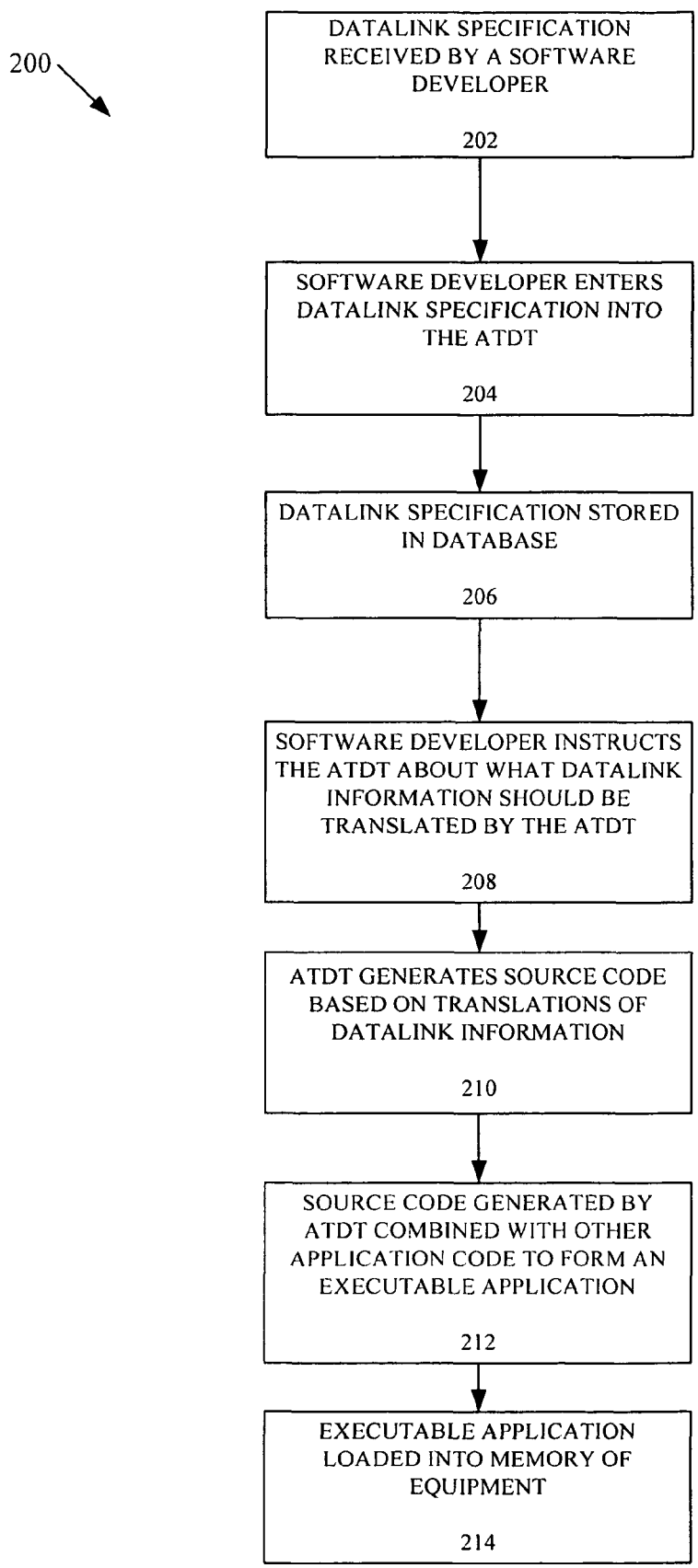
FIG. 2 is a flowchart illustrating an exemplary operational flow of the system of FIG. 1, according to one embodiment.

FIG. 2 is a flow diagram illustrating an exemplary operational flow 200 of the system of FIG. 1, according to one embodiment. For example, operational flow 200 may be performed by a system such as that shown in FIG. 1. Therefore, the description of operational flow 200 may refer to at least one of the components of FIG. 1. However, any such reference to components of FIG. 1 is for descriptive purposes only, and it is to be understood that the implementations of FIG. 1 is a non-limiting environment for operational flow 200.

Operational flow 200 begins at step 202 where datalink specifications are received by a software developer for input into the ATDT 102. Next, at step 204, the software developer inputs essential information listed in the specification for each datalink into the ATDT 102 using a computer interface, for example, a GUI interface. Next, at step 206, the datalink information input into the ATDT 102 is stored in the specifications database 104. Once the datalink information is stored in the specifications database 104, the datalink information may be used for multiple applications without the software developer re-entering the same information.

At step 208, the software developer instructs the ATDT 102 as to which datalinks will be communicating with each other using the executable application 110. The software developer may input such information into the ATDT 102 using a computer interface, for example, a GUI interface. Next, at step 210, the software developer instructs the ATDT 102 to generate the source code 106 for use in facilitating communications between the designated datalinks using the datalink information stored in the specifications database 104. At step 212, the source code 106 is combined with other application code 108 produced by a software developer to form the executable application 110. Lastly, at step 214, the executable application 110 is subsequently be loaded into memory or memory devices residing in various pieces of equipment in order to facilitate communications between the various pieces of equipment, even though they may have different datalink protocols.

FIG. 3 illustrates an exemplary operational flow 300 for converting received datalink information into metadata using the ATDT 102, according to one embodiment. After receiving information regarding which datalinks translations are required by a software developer, at step 302, the ATDT 102 retrieves information about each specified datalink to be translated from the specifications database 104. At step, 304, the ATDT 102 converts the information associated with a given datalink into metadata. Metadata is a common language format used by the ATDT 102 for correlating information required by different datalinks. For example, there may be metadata assigned to "altitude." The metadata "altitude" would be assigned to any datalink information regarding distance above the ground. For instance, the metadata term "altitude" would assigned to a datalink using the term "height" or "altitude" or "elevation", etc.

FIG. 4 illustrates an exemplary operational flow 400 for matching metadata and translating fields of information between datalinks by an automated tactical datalink translator, according to one embodiment. Once metadata is assigned to all datalink information designated by the software developer using tactical datalink definitions stored in specifications database 104, at step 402, the ATDT 102 matches all the terms that have the same assigned term, for example, all terms assigned "altitude" are matched. Once matched, each term having the same assigned term is translated used using known conversion factors for the given term, for example, (1 foot =0.3048 meters for translating one term measured in feet with a second term measured in meters, when both have the same assigned term "altitude"). Thus, datalinks having different units of measurement for distance above the ground may communicate with each other using the metadata term "altitude" because the ATDT 102 has the ability to translate and equate the various formats.

FIG. 5 illustrates an exemplary operational flow 500 for generating a source code 106 having datalink translations provided by the ATDT 102, according to one embodiment. Once all translations have been performed by the ATDT 102, at step 502, the ATDT 102 generates the source code 106. The source code 106 can subsequently be combined with the application code 108 to create an executable application 110 for use in providing communications between pieces of equipment having different datalinks. The executable application 110 created through the combination of the source code 106 and the application code 108 occurs by providing both files to a compiler (not shown) when software development is nearly complete or complete.

Thus, any software developer relatively familiar with datalink communications may use the ATDT 102 by specifying which datalinks are communicating with each other, and what information will be communicated between the specified datalinks. By using the ATDT 102, the software developer can create source code 106 for use in communications between different datalinks through an automated process by converting the desired datalink information into metadata. The ATDT 102 translates the metadata and provides the source code 106 for use in communications between the desired datalinks. By automating the generation of source code 106 for datalink communications, manpower, time and cost are reduced during software development.

DETAILED DESCRIPTION

Figure 6:
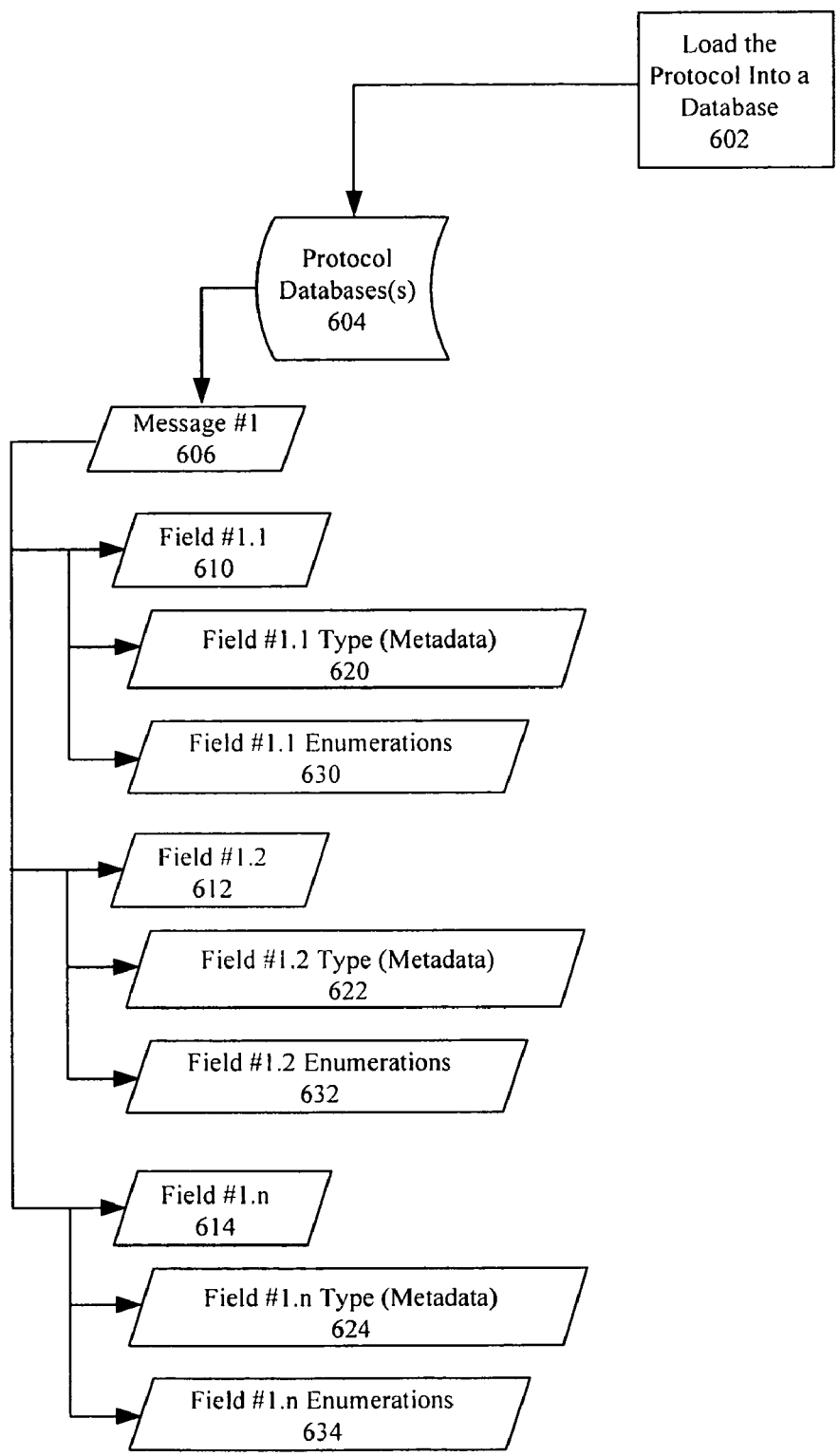
FIG. 6 is a flowchart illustrating a first step of the ATDT process and the messaging format.

The Automated Tactical Datalink Translator (ATDT) proposes a process that would provide an automated method of generating code configured to facilitate the translating between two computer system protocols. The first step in the ATDT process, illustrated in FIG. 6, is to load the each protocol of interest 602 into a database 604. Loading each protocol into a database requires that the respective protocols be dissected into their most fundamental building blocks. Most protocols are comprised of one or more messages 606 that are made up of one or more fields 610, 612, 614. The simplistic nature of the depiction of the messaging format shown in FIG. 6 is for illustration purposes. The ATDT tool is capable of handling protocols consisting of far greater complexity than that illustrated in FIG. 6, requiring further grouping and nesting of fields. During the process of dissecting the protocol, each message and field will be tagged with a standardized metadata tag 620, 622, 624. The purpose of these metadata tags is to establish the common constructs between protocols so that one protocol can be mapped to another through automation. Accordingly, FIG. 6 shows the beginnings of the dissection of a basic message that has at least three fields 610, 612, 614. Each field has an associated field type 620, 622, 624. This field type represents metadata that can be used during code generation to determine how to translate from one protocol to the next. Only two pieces of metadata, type 620, 622, 624 and enumerations 630, 632, 634 are shown in FIG. 6 in an effort to simply the illustration. However, there can be numerous pieces of metadata on any given component (message, field, or abstract grouping). Such metadata includes but is not limited to, field size, maximum and minimum values, purpose, description, starting bit location, ending bit location, transmission rates, associated messages, message sequences, enumerations (valid field values), transmit/receive rules, revision, update rates, applicable standards, starting delimiter, ending delimiter, encryption or encoding, minimum and maximum number of occurrences, validity checking rules, and usage of the same field within other messages within the protocol.

While the majority of the process description for the present invention has focused on the message and field level of the computer protocols, it is to be understood that the ATDT process allows for higher abstraction of messages and would therefore be supported by an ontology. For example, some protocols group messages into a common category. Examples may include concepts such as Network Control, Air Surveillance, Distributed Routing and the like. These higher-level abstractions typically represent groups of two or more messages. It is contemplated that a respective ontology developed for the ATDT process would include the ability to group messages and allow the operator to quickly identify several messages at once simply by selecting a higher level function as opposed to having to determine each individual message (although the process allows the operator to determine each individual message).

Many protocols require a sequence of messages. This is often referred to as 'handshaking' or 'transactions' in the trade whereby a successful message exchange is comprised of the ordered sequence of one or more messages. It is contemplated that the ATDT process shall support the identification of related handshaking messages. This would allow the operator to selected the highest level message (or the core message in the sequence) and rely on the ATDT tool to incorporate the rest of the related messages. This information would be stored in the protocol database and would also be tagged with metadata so as to allow the ATDT process to identify those common constructs, or in this case, message sequences.

In the present embodiment, once the protocol is loaded into a protocol database 604, the process does not need to be repeated unless the protocol changes or if a new protocol needs to be added that has not been added to the database previously. Additionally, the ATDT process does not imply that all protocols need to reside in a single database. It is to be understood that a given database may contain as few as one protocol or as many as the underlying database can contain. The most important factor in the loading of a protocol into a database is the mapping of the individual building blocks to a common metadata representation.

Figure 7:
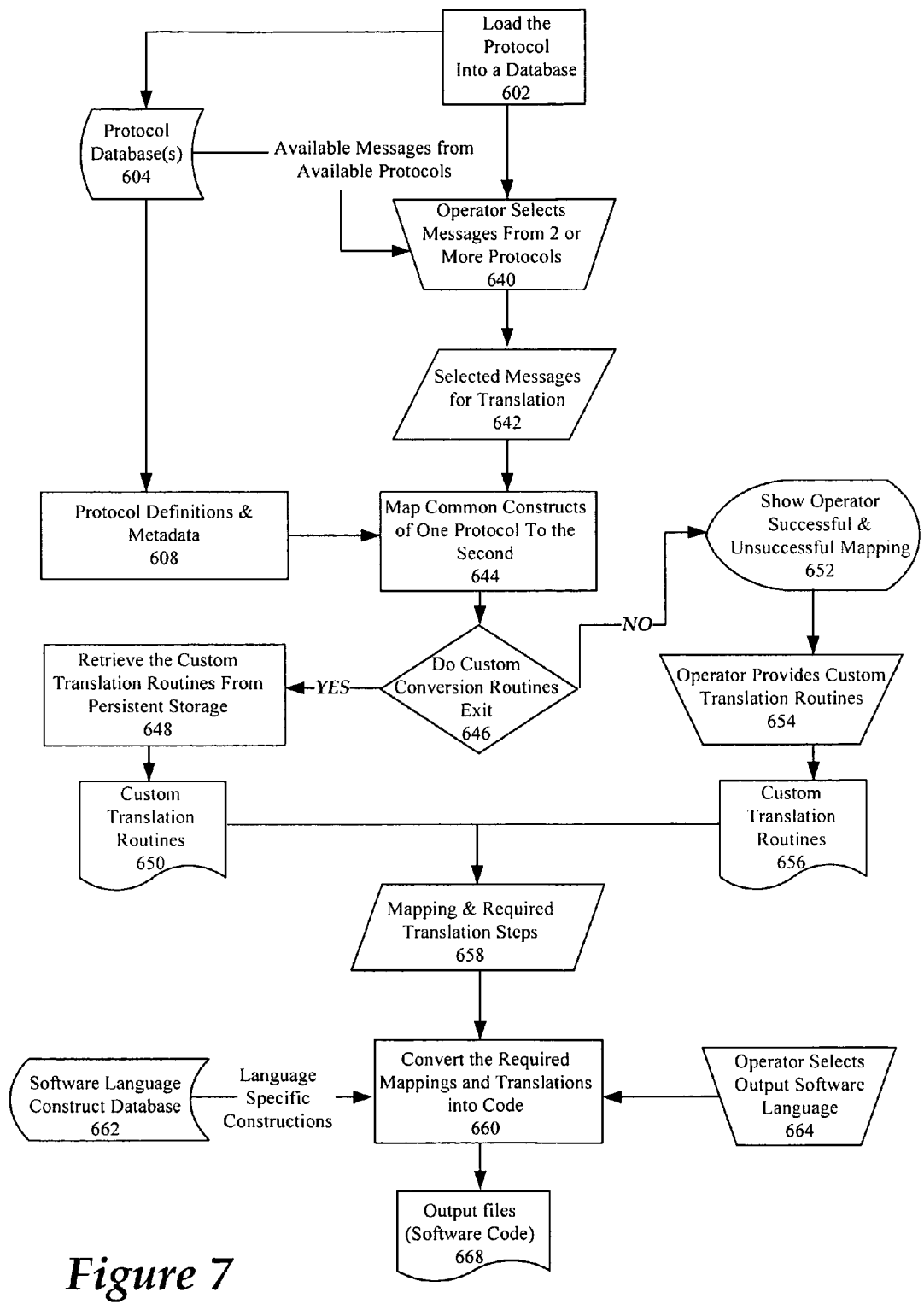
FIG. 7 is a flowchart illustrating the ATDT process.

As illustrated in FIG. 7, the second step in the ATDT process is prefaced by some operator interaction, whereby the operator is provided with a method of selecting which protocols the operator would like to have translated 640. In particular, the operator would be given the option to selectively choose which individual messages or fields they desire to have translated. The selection process provides the operator with considerable control over the scalability of the process and thereby control over the amount of information that is translated. The list of available messages and protocols is retrieved from the database 604.

Once the operator finishes a selection of the messages 642 that they would like to have translated, the selections made are passed to a second process (which in some embodiments shall be automated) that maps the common constructs from a first protocol to a second protocol 644. This process is accomplished by retrieving the protocol definitions and metadata from each of the respective protocol databases 604 and mapping the two protocols based on the protocol definitions. As an example, suppose two protocols contained a message for reporting the location of some entity, e.g. an airplane. This part of the process would search for the corresponding position reporting message in the desired output protocol, which is chosen by the operator. Next this automated process would look for common constructs such as latitude, longitude, altitude, air speed, etc. Depending on what fields are available from the source protocol message, if there are any required translation (e.g. feet to meters, degrees to radians, et al), this process would also identify the required translations.

In addition to identifying messages that may be translated, the mapping process also identifies constructs, which could not be translated. Constructs cannot be translated if there are no custom conversion routines 646. If there are custom translation routines, the routines are retrieved from data storage 648, 650. If there are no custom conversion routines, the operator is provided both the successful and unsuccessful mappings 652. At this point, the operator may either ignore these discrepancies caused by the unsuccessful mappings or provide custom conversion routines if the mapping process failed to adequately identify a method for translating this information from one protocol to the next 654, 656. Since the operator would most likely want to repeat this entire process multiple times, any corrections that the operator is required to make at this point in the process could be saved to persistent storage (e.g. a file or database) for retrieval later. Thus if the operator had to provide custom conversion routines for ten of the translations, these could be retrieved automatically the next time the operator runs the process, thereby streamlining the entire operation on successive iterations.

The final steps of the ATDT process is to convert the required mappings and translations into code 658. Like the construct mapping process, this is an automated process working off of the information gathered from the previous processes. The final piece of information required from the operator would be the software language 662, 664 to use for the translation. The software language determines the output format of the translation code 668. One of the distinguishing factors of the ATDT process is its ability to support multiple software languages. This is accomplished by defining the translations in a language agnostic form. Thus the process of converting the mappings and translations to code 660 involves the cross referencing of the language agnostic translation instructions into language specific constructs. These software language specific constructs are retrieved from a separate database. This would allow new software languages to be added in the future without the need to completely revamp the ATDT process. Further it would allow the operator to choose the output language that best fits their specific needs based on the host platform on which they are trying to run. Thus, instead of forcing the operator to adapt to the output of the ATDT process, the ATDT process adapts its output to the needs of the operator by constructing the code in a format that best matches the needs of the operator.

One of the keystones to the ATDT process is the development of an ontology, which allows the operator to define their protocols in an agnostic format. This ontology would be the basis for the metadata that would allow the operator to categorize each of the messages, fields, or any other construct that can be used to represent a protocol. This would include things such as enumerations. For example, one protocol may represent an F/A-18 as a string while another protocol may represent an F/A-18 as the number ten in binary. The ontology would provide a common means of representing these two formats so that the ATDT process could identify these clearly different representations as the same item. In addition to enumerations, the ontology would define common types as well. In the computing industry these are relatively finite and include such things as integers, floating point numbers, fixed point numbers, and strings. There are variants of each of these and it is contemplated that the ATDT process would enumerate each of these. These basic types are the foundation for determining how to generate the code that would translate a field value from one protocol to the next.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method for providing automated data translations for information to be transmitted between differing datalinks used in communications between various pieces of equipment, the method comprising:
    storing specification requirements for a plurality of the differing datalinks in a data storage medium;
    receiving information associated with a first datalink and a second datalink of the plurality of datalinks for translation by a translator;
    converting the received information into metadata using the stored specification requirements for the first datalink and the second datalink;
    matching terms in the metadata by a computing system;
    mapping by the computing system constructs that are common between protocols associated with the first datalink and the second datalink based on the matched terms, wherein the common constructs include dissections of the protocols into a message and a field;
    generating by the computing system datalink communication source code using the mapped common constructs, the generated datalink communication source code for facilitating communication between the first datalink and the second datalink;
    combining the datalink communication source code with an application code to form an executable application; and
    loading the executable application onto at least two pieces of equipment.

2. The method of claim 1, wherein storing specification requirements occurs using a graphical user interface.

3. The method of claim 1, wherein receiving information occurs using a graphical user interface.

4. The method of claim 1, wherein the translation step utilizes a plurality of conversion factors.

5. The method of claim 4, wherein the plurality of conversion factors are stored in the data storage medium.

6. The method of claim 1, wherein the data storage medium is a database.

7. The method of claim 1, wherein the specification requirements are tactical datalink definitions.

8. A non-transitory computer readable storage medium storing a computer readable program for providing automated data translations for use in maintaining communications across differing datalinks, said computer readable program being configured to operate a computer to:
    store specification requirements for a plurality of differing datalinks in a data storage medium;
    receive information associated with a first data link and a second datalink of the plurality of datalinks to be translated by a translator;
    convert the received information into metadata using the stored specification requirements for the first datalink and the second datalink;
    match terms in the metadata;
    map constructs that are common between protocols associated with the first datalink and the second datalink based on the matched terms, wherein the common constructs include dissections of the protocols into a message and a field;
    automatically generate datalink communication source code using the mapped common constructs, the generated datalink communication source code for use in facilitating communication between the first datalink and the second datalink;
    combine the datalink communication source code with an application code to form an executable application; and
    load the executable application onto at least two pieces of equipment.

9. The computer readable storage medium of claim 8, wherein the data storage medium is a database.

10. The computer readable storage medium of claim 8, wherein the specification requirements are tactical datalink definitions.

11. A computer system for generating an executable application for use in datalink communications, the system comprising:
    a database for storing specification information for a plurality of different datalinks;
    a translator for:
        receiving information indicating translation is required between a first datalink and a second datalink of the plurality of datalinks;
        converting the specification information associated with the first datalink into first metadata and the specification information associated with the second datalink into second metadata;
        matching terms in the metadata; and
        automatically generating datalink communication source code using constructs that are common between protocols associated with the first and second metadata based on the matched terms, wherein the constructs include dissections of the protocols into a message and a field; and
    a compiler for combining the datalink communication source code and application code created by a software developer to form an executable application providing communication between the first datalink and the second datalink, wherein the executable application is loaded onto at least two pieces of equipment.

12. The system of claim 11 further comprising a graphical user interface for inputting specification information and indicating translation is required between the first datalink and the second datalink.

13. The system of claim 11, wherein a plurality of conversion factors are stored in the database.

14. The system of claim 11, wherein the converting step and generating step are automated.

* * * * *